No. 730,747. PATENTED JUNE 9, 1903.
M. C. CRAWLEY.
COFFEE POT.
APPLICATION FILED FEB. 1, 1902.
NO MODEL.

Witnesses
Alfred W. Ticker
Frank Turner

Inventor
Mansfield C. Crawley.
by Higdon & Longan Attys.

No. 730,747. Patented June 9, 1903.

UNITED STATES PATENT OFFICE.

MANSFIELD C. CRAWLEY, OF ST. LOUIS, MISSOURI.

COFFEE-POT.

SPECIFICATION forming part of Letters Patent No. 730,747, dated June 9, 1903.

Application filed February 1, 1902. Serial No. 92,142. (No model.)

*To all whom it may concern:*

Be it known that I, MANSFIELD C. CRAWLEY, of the city of St. Louis, State of Missouri, have invented certain new and useful Improvements in Coffee-Pots, of which the following is a full, clear, and exact description, reference being had to the accompanying drawings, forming a part hereof.

My invention relates to coffee-pots; and it consists of the novel construction, combination, and arrangement of parts hereinafter shown, described, and claimed.

My object is to construct an improved coffee-pot; and my invention consists of a suitable receptacle and a non-heat-conducting chambered cover mounted in position to close the upper end of the receptacle above the coffee-bag and having an inlet-passage leading from the outer air to said receptacle adapted to receive a funnel, a trap in said inlet-opening, as required, to prevent steam from passing upwardly through the inlet-opening, there being a small vent in the upper end of the receptacle to let air out when liquid is running in through the funnel.

Figure 1:
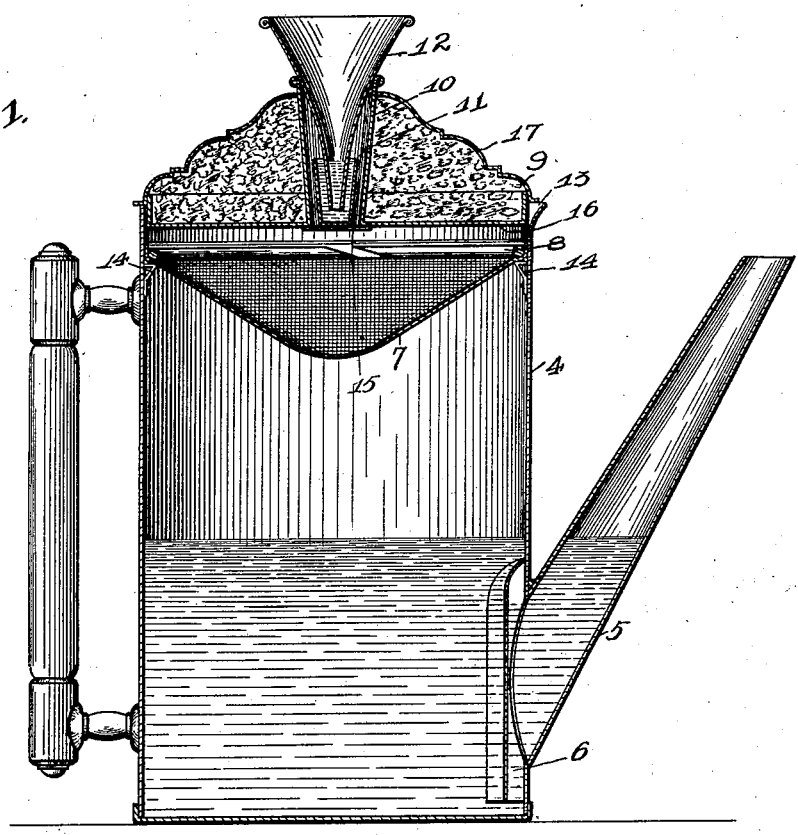
Figure 2:
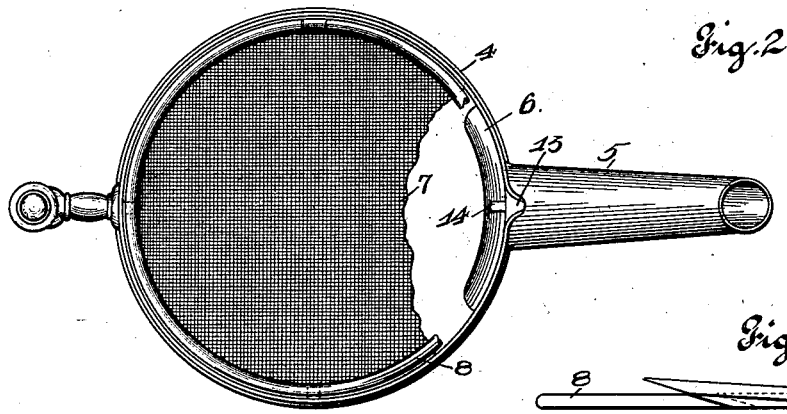
Figure 3:

Figure 1 is a vertical central section of a coffee-pot embodying the principles of my invention. Fig. 2 is a top plan view with the cover removed, parts being broken away to illustrate the construction. Fig. 3 is a view in elevation of the spring-ring employed in supporting the coffee-bag.

Referring to the drawings in detail, the coffee-pot comprises a suitable receptacle 4, having the outlet-spout 5 leading from near its bottom; the trap 6, inserted in the receptacle over the outlet-opening, as required, to keep steam from passing outwardly through the spout and, as required, to draw liquid from the extreme bottom of the receptacle through the spout; the cloth or bag 7, mounted in the upper end of the receptacle and held in position by the spring-ring 8, as required, to entirely close the upper end of the receptacle; the non-heat-conducting cover 9, inserted in the upper end of the receptacle and having the inlet-opening 10; the trap 11, mounted in the inlet-opening 10 and adapted to receive the funnel 12, which fits closely in the upper end of the inlet-opening and extends downwardly into the trap 11, there being a vent 13 in the upper end of the receptacle, as required, to allow air to pass out of the receptacle when liquid is running into the funnel.

The brackets 14 are inserted in a horizontal line in the upper end of the receptacle 4 to support the bag 7 and the ring 8. The ring 8 has its ends beveled and offset relative to each other, as shown in Fig. 3, so that the ring may be compressed and inserted into position within the bag and then released and allowed to expand, as required, to press the edge of the bag firmly against the inner surface of the receptacle and hold it in position.

The trap 11 is a small cup mounted in a central position in the lower end of the inlet-opening 10 and supported by the brace 15. The discharge end of the funnel 12 extends downwardly into the cup, and it is obvious that when liquid is poured into the funnel the cup will be filled and the surplus will overflow and that the cup will always remain filled with liquid, thus forming a water lock or trap to prevent steam from passing upwardly through the funnel. The lower portion of said funnel is spaced from the sides of said passage. The space around the trap and around the lower end of the funnel forms a condenser, the material of the inlet-opening being kept cool by the non-conducting material composing the cover, which is asbestos or mineral wool or the like, and the products of condensation will drip downwardly upon the coffee in the bag 7. Another advantage derived from the trap is due to the fact that the water will spread over the edge of the cup and its force will be broken up and it will drip upon the coffee in the bag, whereas if the cup is removed the water will pass downwardly through the funnel in a solid stream.

The cover 9 consists of a flat lower section 16 and the embossed upper section 17, connected together at their edges, and the intervening space is filled with asbestos or mineral wool, as before suggested, the object of the mineral wool being to provide a non-heat-conducting cover which will protect the funnel and the inlet-opening from the excessive heat and will keep the heat in the receptacle. This construction also keeps the upper section 17 comparatively cool, so that the danger of burning the operator's hands is eliminated.

The vent 13 is formed by bending the upper edge of the receptacle slightly, and its purpose is to allow the air to escape slowly from the receptacle as the water passes inwardly through the funnel. The size of this vent will regulate the inflow of the water, and this construction is useful to cause the water to flow slowly through the funnel and through the trap and drip upon the coffee in the bag. If the vent is closed entirely, water could not pass through the funnel unless it passed out through the spout 5. Consequently the feed of the water through the funnel may be accurately regulated by the size of the vent 13.

In operation the coffee is placed in the bag 7, hot water is poured in the funnel 12, and the water slowly passes through the trap and drips upon the bag to the bottom of the receptacle. The steam arising from the water in the bottom of the receptacle will pass through the bag and be condensed against the bottom of the cover and within the inlet-opening 10 around the trap and funnel, and the products of condensation will fall upon the coffee and again pass downwardly into the receptacle.

I claim—

In a coffee-pot, the combination of a receptacle provided with a chambered cover filled with a non-conductor of heat, said cover formed with a passage leading from the outer air to the receptacle, a cup, supported within the passage, and a funnel supported by the cover and extending downward into the cup, forming a trap, said cup and the lower portion of said funnel being spaced from the sides of said passage, substantially as described.

In testimony whereof I affix my signature in presence of two witnesses.

MANSFIELD C. CRAWLEY.

Witnesses:
 ALFRED A. EICKS,
 FRANK TURNER.